United States Patent [19]

Basu et al.

[11] Patent Number: 4,890,289

[45] Date of Patent: Dec. 26, 1989

[54] FIBER COUPLED DIODE PUMPED MOVING SOLID STATE LASER

[75] Inventors: Santanu Basu, Palo Alto; Robert L. Byer, Stanford, both of Calif.

[73] Assignee: Board of Trustees of Leland Stanford, Jr. University, Stanford, Calif.

[21] Appl. No.: 128,581

[22] Filed: Dec. 4, 1987

[51] Int. Cl.⁴ .............................................. H01S 3/093
[52] U.S. Cl. ........................................ 372/33; 372/6; 372/20; 372/35; 372/36; 372/75
[58] Field of Search ................... 372/6, 20, 33, 34–36, 372/75, 69–72, 66

[56] References Cited

U.S. PATENT DOCUMENTS

| | | | |
|---|---|---|---|
| 3,633,126 | 1/1972 | Martin et al. | 372/35 |
| 4,383,318 | 5/1983 | Barry et al. | 372/6 |
| 4,555,786 | 10/1985 | Byer | 372/70 |
| 4,713,822 | 12/1987 | Lee | 372/69 |
| 4,785,459 | 11/1988 | Baer | 372/70 |

FOREIGN PATENT DOCUMENTS 0024989  3/1981  Japan ....................................... 372/6

OTHER PUBLICATIONS

Basu et al.; "A Proposed 1KW . . . Nd: Glass Laser"; IEEE Journal of Quantum Electronics, vol. QE-22, No. 10; 10/1986; pp. 2052–2057.
Basu et al.; "A Moving Slab . . . Power Levels"; Optics Letters, vol. 11, No. 10; 10/1986; pp. 617–619.

Primary Examiner—William L. Sikes
Assistant Examiner—Xuan Thi Vo
Attorney, Agent, or Firm—Cushman, Darby & Cushman

[57] ABSTRACT

A moving solid state laser gain structure is optically pumped by optical pumping radiation derived from a remote bank of diodes, preferably laser diodes. The pumping radiation is guided and concentrated from the bank to the laser gain structure over a bundle of fiber optic waveguides. In some embodiments, the laser gain structure is a slab of Nd:Glass or Nd:YAG. In some embodiments, the lasant beam is internally reflected within the slab over a zig-zag path. In one embodiment, the lasant slab is a rotating and translating disk with the pumping radiation being applied collinearly of the beam of lasant radiation. In another embodiment, the lasant slab is made up of a bundle of fiber optic waveguides.

17 Claims, 4 Drawing Sheets

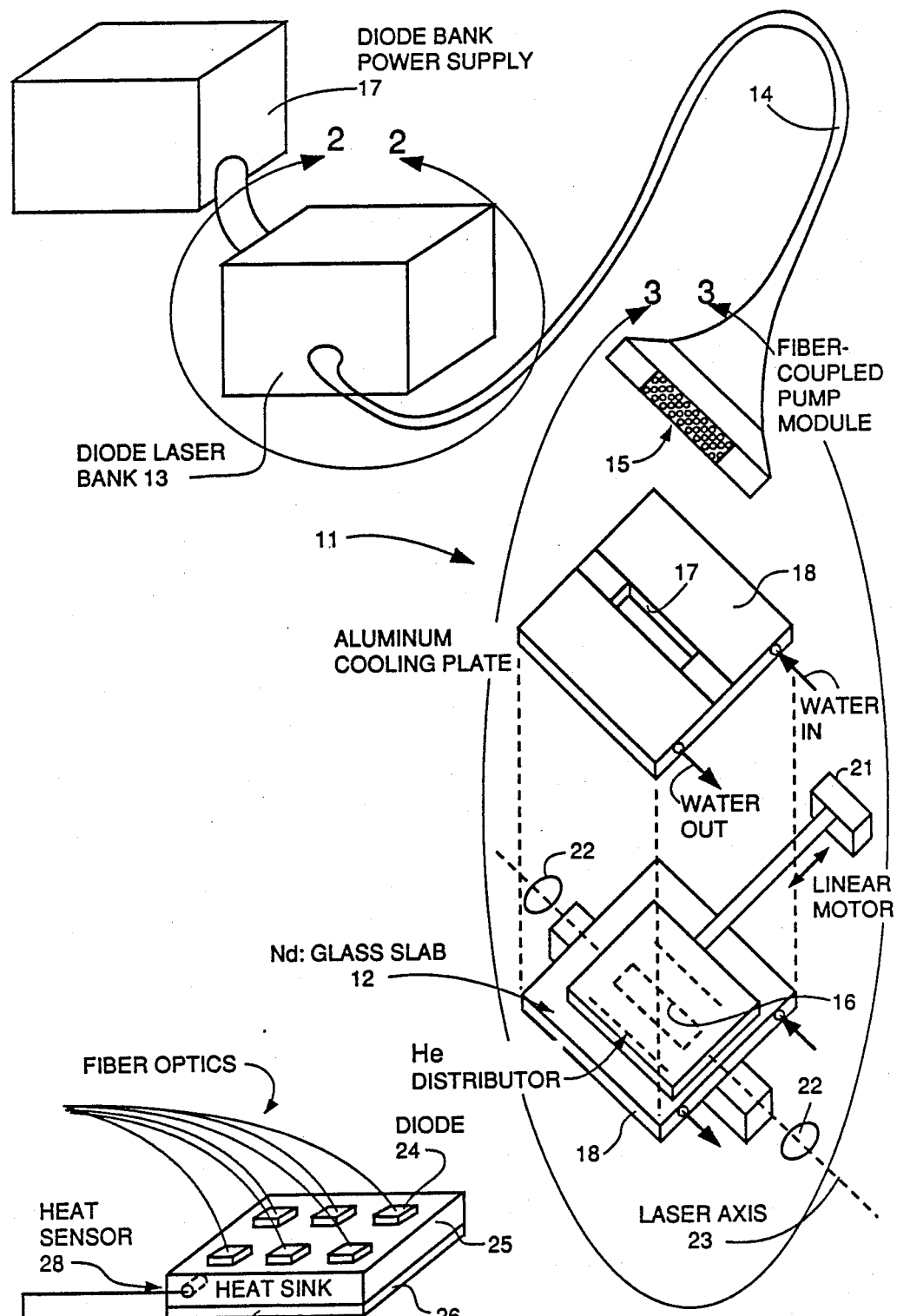

FIBER COUPLED DIODE PUMPED MOVING SOLID STATE LASER

GOVERNMENT CONTRACT

The present invention was made in performance of U.S. Air Force Office of Scientific Research Contract Number F 49620-85-C-0062 and the Government has certain rights therein.

BACKGROUND OF THE INVENTION

The present invention relates in general to solid state lasers, and, more particularly, to diode pumped high average power solid state lasers, useful for metal cutting, fusion experiments, ultra-violet and x-ray lithography, etc.

DESCRIPTION OF THE PRIOR ART

Heretofore, it has been proposed to diode side pump a high average power Nd:YAG laser rod by combining and concentrating the diode pumping light from a multitude of remote individual optical pumping diodes in a fiber optic link and directing the output of the fiber optic link into the Nd:YAG rod through the side thereof. Such a laser is disclosed in U.S. Pat. No. 4,383,318, issued 10 May 1983.

One of the problems with such a laser is that at high average output beam power on the order of kilowatts, the Nd:YAG rod will manifest severe thermal and stress-induced birefringence and laser gain non-uniformity.

It is also known from the prior art to mitigate thermal and stress birefringence by going to a flashlamp side pump Nd:YAG laser slab geometry and causing the laser beam to travel in a zig-zag path between the flashlamp pumped broad side faces of the slab. Such a laser is disclosed in U.S. Pat. No. 3,633,126, issued 4 Jan. 1972.

It is also known from the prior art to cyclically move a slab of Nd:Glass laser material relative to the side pumping flashlamps to effectively average the thermal loading on the laser slab. Such a moving slab laser is disclosed in U.S. Pat. No. 4,555,786 issued 26 Nov. 1985 and the disclosure thereof is hereby incorporated by reference in its entirety.

SUMMARY OF THE PRESENT INVENTION

The principal object of the present invention is the provision of an improved solid state laser capable of high average power operation and which is diode pumped.

In one feature of the present invention, a structure of laser gain material is optically pumped by optical pumping radiation emanating from a multitude of remote pumping diodes. The pumping light is guided and concentrated from the remote diodes to the laser gain material by fiber optic waveguides and the laser gain medium is moved relative to the pumping region to distribute the heat generated by the pumping radiation throughout the laser gain material.

In another feature of the present invention, the pumping diodes are laser diodes and the diodes are selectively temperature tuned to an absorption wavelength of the laser gain material for enhancing the optical pumping efficiency of the laser.

In another feature of the present invention, the optical pumping radiation is directed into a slab of laser gain material through at least one of its broad faces.

In another feature of the present invention, the optical pumping radiation is directed into a slab of lasant material through at least one of its broad faces and generally collinearly with the beam of lasant radiation emanating from the pumped region of the slab.

In another feature of the present invention, the laser gain material is rotated and translated relative to the optically pumped region thereof for distributing the heat throughout the pumped laser gain material.

In another feature of the present invention, the laser gain structure comprises a bundle of fiber optic waveguides.

Other features and advantages of the present invention will become apparent upon a perusal of the following specification taken in connection with the accompanying drawings wherein:

BRIEF DESCRIPTION OF THE DRAWINGS

FIG. 1 is a perspective view, partially exploded, and partially in block diagram form, of a laser incorporating features of the present invention.

FIG. 2 is a schematic diagram, partly in block diagram form, of a portion of the structure of FIG. 1 delineated by line 2—2, FIG. 5 is a plan view similar to that of FIG. 3 depicting an alternative embodiment of the present invention.

DESCRIPTION OF THE PREFERRED EMBODIMENTS OF THE PRESENT INVENTION

Figure 3:
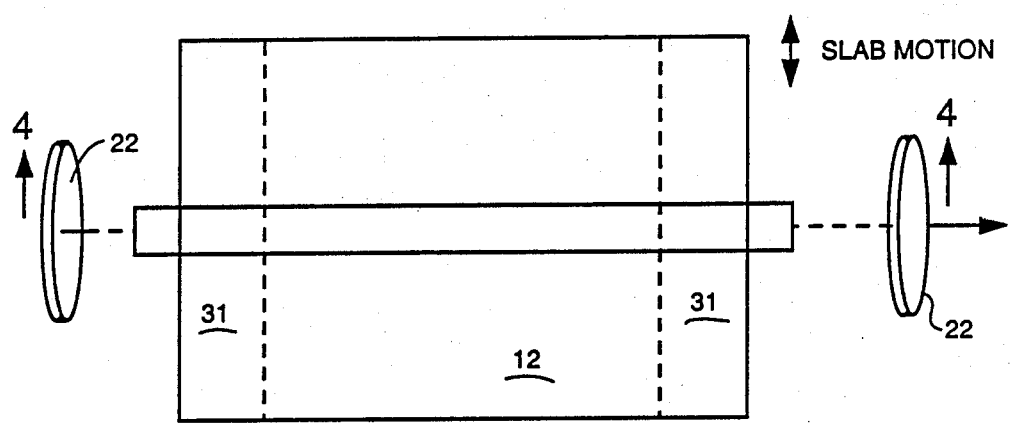
FIG. 3 is a plan view of an alternative embodiment of the portion of the structure of FIG. 1 delineated by line 3—3, thereof.

Referring now to FIG. 1, there is shown a laser 11 incorporating features of the present invention. A slab 12 of laser gain material, such as LHG-5 Nd:Glass, commercially available from Hoya Corporation or Nd:YAG, is optically pumped by optical pumping radiation emanating from a multitude of diode sources, such as Model SD2-2400, single stripe laser diodes, commercially available from Spectra Diode Labs of San Jose, Calif. or light-emitting diodes, contained in a diode laser bank 13 disposed at a location remote from the slab 12. The optical pumping radiation is transmitted from the bank 13 to the slab 12 via the intermediary of fiber optic waveguides 14, as of 150$\mu$m diameter each.

Individual ones of the diodes sources are connected to a remote end of individual fiber optic waveguides 14. The individual fiber optic waveguides are then bundled together for guiding and concentrating the optical pumping radiation. The ends of the fibers 14 proximate the slab 12 are arrayed into a relatively long, narrow cross-sectional area at 15 to define an elongated narrow optical pumping aperture through which the optical pumping radiation is directed into the slab 12 through a broad side face thereof for pumping an elongated, selected region 16 of the slab 12.

The packing density of the optic fibers 14, at the aperture 15, is much greater than the packing density of the individual diodes sources in the bank 13 to facilitate cooling of the diode sources. Power is supplied to the diode bank 13 from a power supply 17. The power supply may be an integral part of the diode source laser bank 13. The packing density of the optical fibers 14, at the aperture 15, yields increased gain in the laser medium which in-turn yields improved laser operation and improved efficiency of energy and power extraction from the laser slab 12.

The laser slab 12 is cooled by conduction through a thin static film of gas, such as helium, overlaying the broad faces of the laser slab 12 to water cooled metallic cooling plates 18, as of aluminum. The plates 18 are bolted together at opposite broad faces of the laser slab 12 and are centrally apertured at 19 to receive the array of optic fibers 14.

A linear motor 21 is mechanically coupled to the laser slab 12 for cyclically reciprocating the slab 12 relative to the selectively pumped region 16 to uniformly distribute the heat generated by absorption of the optically pumping radiation in the slab 12. Other means of translating the slab may be utilized, as appropriate, as alternative embodiments of the laser system.

The laser 11 is operable either as a light amplifier or oscillator. In the case of a light oscillator, a pair of mirrors 22 are placed at opposite ends of the slab and on the optical axis 23, which passes axially through the selected optically pumped region 16. Stimulated emission of radiation at the laser transition wavelength, as of 1055 nm, for the case of LHG-5 glass and emanating from the optically pumped region 16 on the optical axis 23, excites a resonant mode of the optical resonator defined by the region between the mirrors 22 along the laser axis 23. An output beam, at 1055 nm, is coupled out of one or both of the mirrors by making the respective mirror(s) 22 partially transmissive at the laser wavelength.

In the case of a light amplifier, the mirrors 22 are deleted and a beam of light to be amplified and at the wavelength of the lasant transition is directed through the optical pumped region 16 along the laser axis 23. The beam stimulates emission of radiation at the wavelength of the lasant transition resulting in amplification of the light beam.

Referring now to FIG. 2, there is shown an arrangement for tuning the optical pumping radiation to the optical pumping absorption wavelength of the laser gain medium. Laser diode sources 24 are selected to have the same output wavelength, as of 805 nm, for a given temperature. These selected diodes 24 are then mounted in heat-exchanging relation to a common heat sink 25. The diodes 24 have a common temperature coefficient, such as +0.3nm/° C. The temperature of the heat sink 25 is then elevated by a heater 26 to the desired temperature to give the desired optical pumping wavelength. A temperature controller 27 senses the temperature of the diodes 24 via a heat sensor 28 and compares the sensed temperature with the desired temperature to derive an error signal fed to the heater 26 to control the heater to the desired temperature. The optical outputs from the respective diodes 24 are coupled into the optic fibers 14 via conventional couplers, not shown. A number of such heat sink assemblies, not shown, can be mounted in the diode laser bank. In this manner, the diode laser bank may contain thousands of diodes 24 coupled into fiber optics 14 and guided to the fiber-coupled pump module 15.

Figure 4:
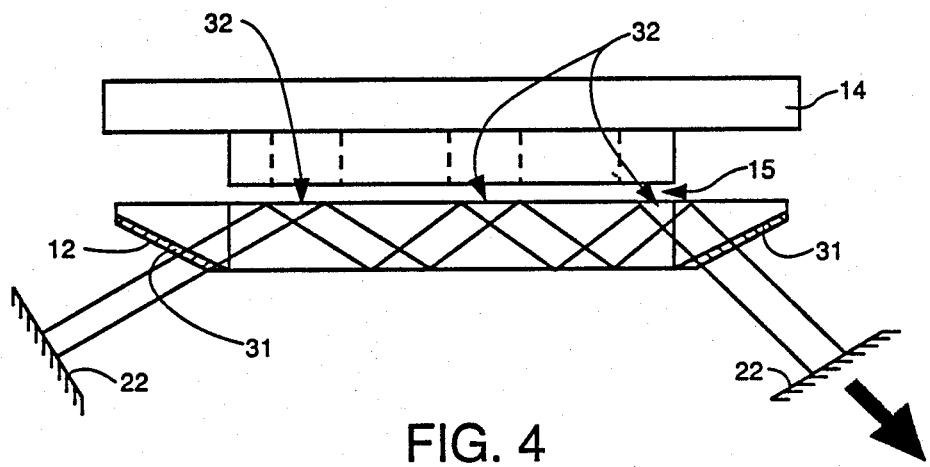
FIG. 4 is a sectional view of FIG. 3 taken along line 4—4 in the direction of the arrows.

Referring now to FIGS. 3 and 4, there is shown an alternative embodiment of the optical resonator of FIG. 1. More particularly, one broad face of the laser slab 12, at opposite ends, is coated with a stripe of an anti-reflective (AR) coating 31. The mirrors 22 of the optical resonator are oriented to reflect the stimulated emission of radiation at an angle to and through the AR coated broad faces of the slab 12 into the slab such that the beam of laser radiation is caused to be internally reflected between the opposed broad faces of the slab 12 along a zig-zag path therethrough. This zig-zag path provides averaging of the thermal and stress produced birefringence and gain non-uniformities.

In a preferred embodiment, the arrayed fibers 14 at the end 15 are partitioned into spatially periodic groups 32 to coincide with the bounces of the optical beam along the zig-zag beam path within the slab 12. This improves the optical pumping efficiency as disclosed and claimed in U.S. Pat. No. 4,617,699, issued 21 Oct. 1986, the disclosure of which is hereby incorporated by reference in its entirety.

Figure 5:
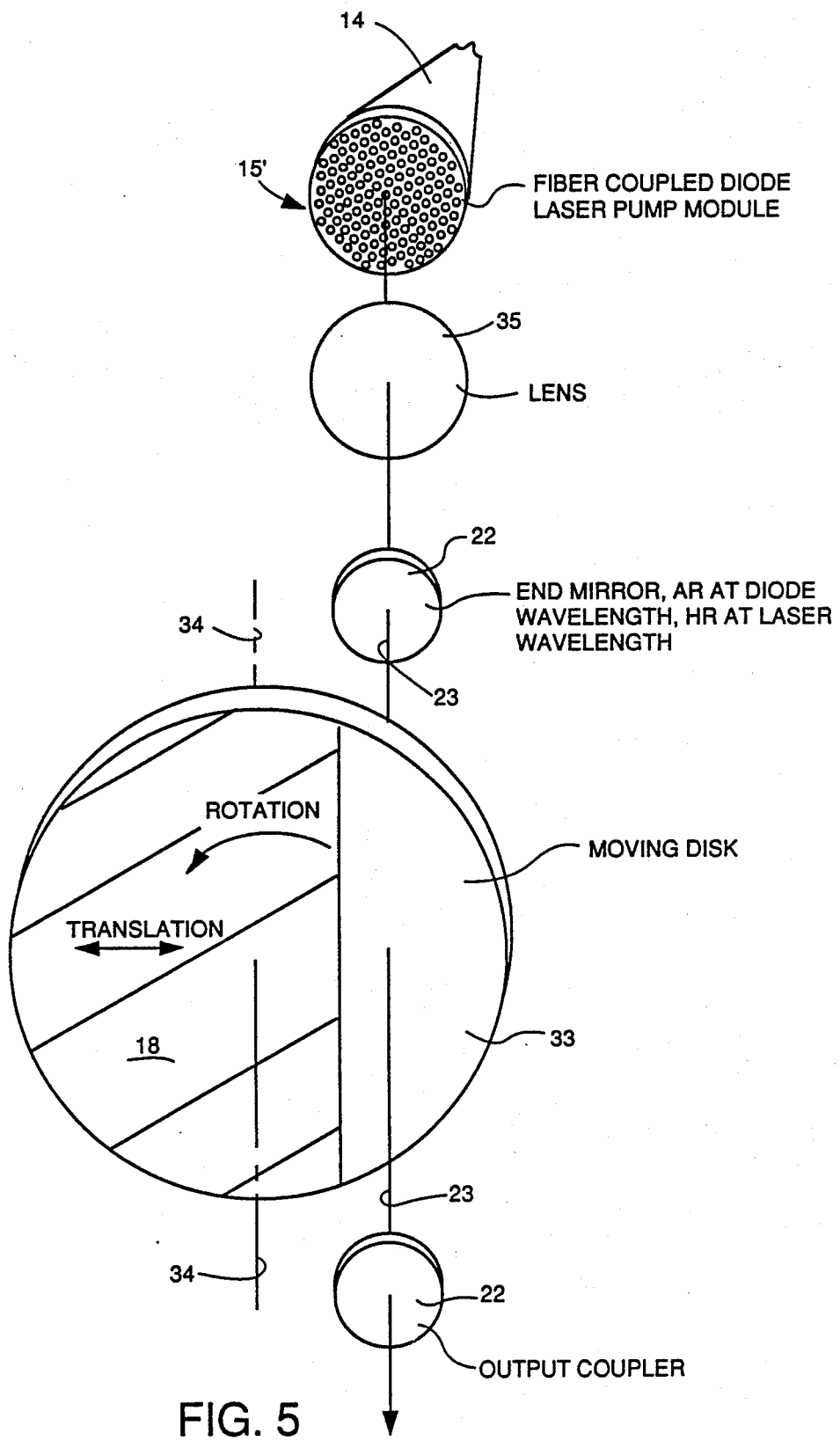
FIG. 5 is a perspective view of an alternative embodiment of that portion of the structure of FIG. 1 delineated by line 5—5.

Referring now to FIG. 5, there is shown an alternative embodiment of the present invention. In this embodiment, the laser gain medium is a disk 33 of Nd:YAG or similarly ion doped gain media, or Nd:Glass material which is caused to rotate about its axis of revolution 34 while being rectilinearly translated to-and-fro in a plane transverse to the axis of revolution 34. Optically pumping radiation derived from the bank of optical pumping diodes 13 via the fiber optic waveguides 14, is directed into the disk 33 through one of its broad faces.

The optic fibers 14 are arrayed into a circular array 15' and the optical pumping radiation is focused by a lens 35 through one of the mirrors 22 of the optical resonator into the TEM$_{00}$ mode of the laser disk 33. The optical pumping beam is collinear of the optical axis 23 of the optical resonator defined by the mirrors 22 which are opposed one another on opposite sides of the disk 33. The mirror 22 through which the optical pumping radiation passes to the disk 33 is coated to be anti-reflective at the pump wavelength and highly reflective at the laser wavelength.

Cooling plates 18 are closely spaced to and opposed to the broad faces of the disk 33 for cooling of the disk. The disk may be tilted such that the optical radiation enters and leaves at Brewsters angle to minimize surface reflection loss.

The disk embodiment of FIG. 5 has the advantage that the laser beam does not have to be totally internally reflected from the two pumping faces as is needed in the zig-zag slab configuration of FIGS. 3 and 4. Thus, the output beam quality is less dependent on the surface finish of the disk 33. Also, larger beam position variations can be tolerated in this geometry, which make it possible to carry out more efficient cooling than provided by the static gas conduction cooling, previously described. Moreover, by stacking up a large number of disks 33 along the optical axis 23, the pumping volume and the heat dissipation area is increased to a large extent. This will allow scaling up the laser to higher average power levels.

Figure 6:
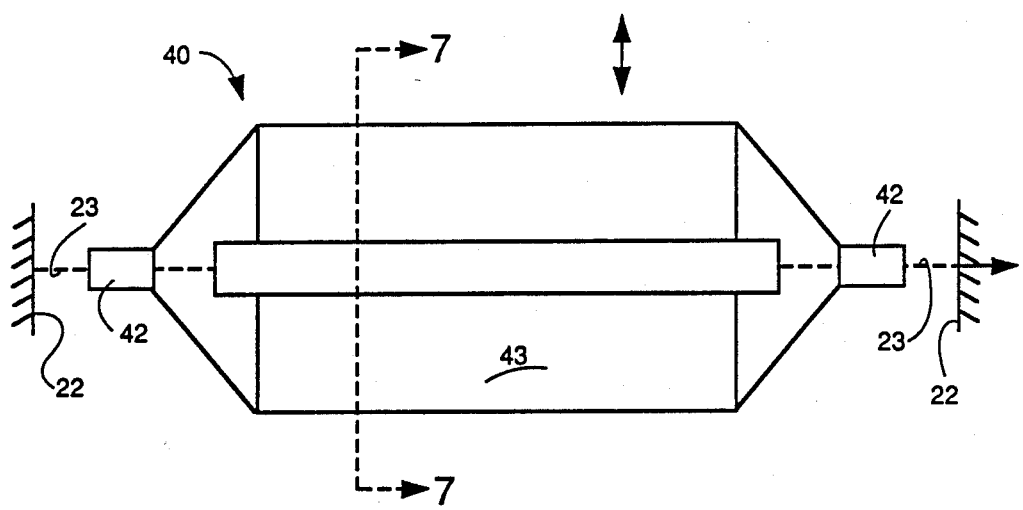
Figure 7:
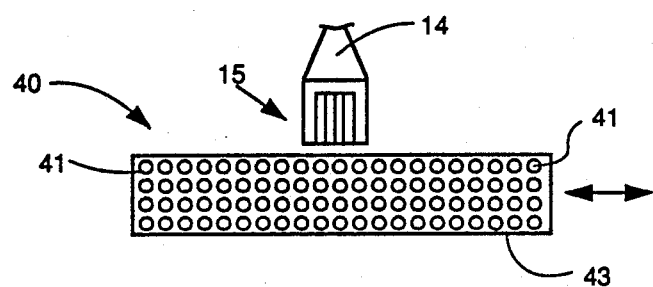
FIG. 7 is a sectional view of the structure of FIG. 6 taken along line 7—7 in the direction of the arrows.

Referring now to FIGS. 6 and 7, there is shown an alternative embodiment of the present invention. In this embodiment, the solid state laser gain medium comprises a bundle 40 of fiber optic waveguides 41 which are arrayed at both ends as circular arrays 42 but which are fanned out from both ends toward the center to define a slab array geometry 43 in the central region. The individual fibers 41 are of Nd:YAG or Nd:Glass laser gain material. The slab 43 is moved relative to the optically pumped regions for the reasons as previously recited herein.

In an alternative embodiment of the laser of FIGS. 6 and 7, the mirrors 22 are deleted and the ends of the individual fibers 41 are made reflective to define individual optical resonators of respective fibers 41. The fibers 41 may be made of differing materials doped with the same or various ions to define lasers of differing output wavelengths.

TABLE I

| Fiber coupled diode laser pumped moving slab Nd:Glass laser. | | | | |
|---|---|---|---|---|
| Design output power | 1 W | 10 W | 100 W | 1000 W |
| Diode power, P (W) cw | 8 | 32 | 300 | 2500 |
| Fiber pattern (@ aperture 15) | $2 \times 2 \times 2$ | $2 \times 2 \times 8$ | $2 \times 4 \times 40$ | $2 \times 8 \times 160$ |
| Thermal load = 0.4 P (W) | 3.2 | 12.8 | 120 | 1000 |
| Min. area (sq. cm)* @ 15 | 0.27 | 1.1 | 16.7 | 140 |
| Slab size (width × length × thickness), cm | $0.5 \times 1 \times 0.25$ | $1 \times 2 \times 0.25$ | $3 \times 6 \times 0.4$ | $10 \times 15 \times 0.4$ |
| Storage eff. | 0.60 | 0.60 | 0.60 | 0.60 |
| Round trip gain | 0.029 | 0.116 | 0.34 | 1.42 |
| Round trip loss | 0.005 | 0.01 | 0.02 | 0.05 |
| Opt. % T | 0.007 | 0.024 | 0.062 | 0.217 |
| Threshold power (W) | 3.6 | 10.4 | 79 | 510 |
| Output power, $P_{out}$ (W) | 1.75 | 10.3 | 110 | 1072 |
| Slope eff, % | 40 | 47.5 | 50 | 54 |
| Overall eff, % | 22 | 32 | 36.5 | 43 |

*Minimum area for heat dissipation = $P_{out} t/(12\eta_{ex}(b/\chi)(\sigma_{max}M_s)$ Referring now to Table I, the design parameters are shown for four different diode laser pumped moving slab Nd:Glass lasers 11 of FIGS. 1 and 2. The cw output power levels range from 1 W to 1 kW. However, power levels in excess of 1 kW are clearly possible by extension of the approach described herein.

As thus far described, cw laser operation has been described to illustrate the features of the present invention. As will be recognized by those skilled in the field, it is equally applicable to pulsed operation. It is well known how to design pulsed lasers for other operations. For example, using pulsed diode lasers 24 and the same geometry, a very high average power pulsed solid state laser 12 is made. The mechanical design for a 5 J/pulse, 200 Hz laser will closely resemble the 1 kW cw laser design of Table I, only cw diode lasers 24 will be replaced by pulsed diode lasers 24. This geometry of fiber coupled diode lasers pumping a moving slab laser can readily be used in the construction of efficient amplifiers. Q-switching, mode-locking, injection seeding, single axial mode operation, operation in a ring laser geometry, and intra-cavity frequency conversion are obtainable in lasers of the present invention.

The pulsed laser can be very conveniently Q-switched, injection seeded and mode-locked to produce peak powers of 48.9 MW at 2 kHz rep. rate as shown in Table II (below). The cw laser can also be mode-locked with an active mode-locker to create 10–50 picosecond pulses with high average power. This mode-locked laser is of great interest for electro-optic sampling and nonlinear wavelength conversion applications. The high peak power pulses are also of interest for efficient harmonic generation to generate green, blue and ultraviolet radiation. The high peak power output is also of interest in x-ray generation by a laser generated plasma.

Such an x-ray radiation source is of use in x-ray microscopy or x-ray lithography.

Intra-cavity nonlinear processes in the fibers 41 can also be carried out in the geometry of FIGS. 6 and 7.

TABLE II

| Diode laser pumped Q-switched and mode-locked moving slab laser. | |
|---|---|
| Acousto-optic Q-switched operation | |
| Rep rate, Hz | 2000 |
| cavity round trip time (ns) | 5.8 |
| cavity lifetime, $t_c$ (ns) | 21 |
| $P/P_{th}$ | 4.65 |
| Threshold inversion, $10^{22}$ m$^{-3}$ | 1.39 |
| Q-switch peak power, $P_{QS}$ (MW) | 0.84 |
| Average output power (Q-switched), (W) | 857 |
| Energy per Q-switched pulse (mJ) | 428 |
| Q-switched pulse FWHM (ns) | 509 |
| Q-switched and injection seeded mode-locked operation | |
| Number of pulses in the Q-switch envelope | 87 |
| Energy per mode-locked pulse (mJ) | 4.89 |
| Peak power (MW) | 48.9 |
| B-integral | 0.259 |

What is claimed is:
1. In a method for generating an output beam of coherent lasant radiation, the steps of:
    coupling the output of a plurality of individual diode sources which form optical pumping radiation, into a fiber optic waveguide structure;
    guiding and concentrating said output through the fiber optic waveguide structure to and thence into a selectively pumped region of a structure of laser gain material for illuminating and for optically pumping of the selected region of the laser gain material, said region being only a part of said structure;
    stimulating emission of coherent lasant radiation from the illuminated and selectively optically pumped region of said laser gain material to produce an output beam of coherent lasant radiation; and
    imparting cyclical relative motion to said structure relative to said region to cyclically move said selectively pumped region relative to the remainder of said gain material so as to distribute the heat generated in said laser gain material by said optical pumping radiation throughout said lasant material to inhibit thermally induced birefringence and gain non-uniformity effects on said output beam.
2. The method of claim 1 including, the step of:
    controlling the temperature of said diode sources selectively for tuning the optical pumping wavelength to an absorption wavelength of the laser gain material for enhancing the optical pumping efficiency.

3. The method of claim 1 including, the steps of:
geometrically shaping said structure of laser gain material to have a pair of relatively broad mutually opposed faces spaced apart by a relatively narrow side face;
internally reflecting the stimulated emission of coherent lasant radiation as a beam to-and-fro between the opposed broad faces along a zig-zag beam path; and
directing the optical pumping radiation emanating from said diode sources and as guided by said fiber optic waveguide structure into said structure of lasant material through at least one of said broad faces of said structure of lasant material.

4. The method of claim 1 including, the steps of:
geometrically shaping said structure of laser gain material to have a pair of relatively broad mutually opposed faces spaced apart by a relatively narrow side face; and
directing the optical pumped radiation emanating from and as guided by said fiber optic waveguide structure from said diode sources into said structure of lasant material through at least one of said broad faces of said structure of lasant material substantially collinearly with said output beam of lasant radiation.

5. The method of claim 4 wherein the step of imparting relative motion between said structure of lasant material and said selectively pumped region of said structure includes the step of:
rotating and translating said structure of lasant material relative to said selectively pumped region.

6. The method of claim 1 including the steps of: bundling together a plurality of fiber optic waveguides to form the structure of laser gain material; and
reflecting the stimulated emission of lasant radiation to-and-fro from the end of and through each said fiber optic waveguide along its length.

7. In a laser:
a plurality of individual diode sources of optical pumping radiation forming optical pumping means;
optic waveguide means optically coupled to said diode sources for guiding and concentrating the optical pumping radiation emanating from said plurality of diode sources;
laser gain means including a structure of laser gain material disposed for receiving the guided and concentrated optical pumping radiation from said optic waveguide means for illuminating and optically pumping a region of said structure of laser gain material selected to be less than all of said structure for producing a lasant beam of stimulated emission of coherent radiation emanating from said optically pumped selected region of said laser gain material; and
driver means for imparting cyclical relative motion between said pumped region of said laser gain material and the remainder of said laser gain material so as to distribute the heat generated in said laser gain material by said optical pumping radiation throughout said laser gain material to inhibit thermally induced birefringence and gain non-uniformity effects on said lasant beam of coherent radiation.

8. The laser of claim 7 including:
tuning means for controlling the temperature of said diode sources selectively for tuning the optical pumping wavelength to an absorption wavelength of the laser gain material for enhancing the optical pumping efficiency.

9. The laser of claim 7 wherein:
said laser gain structure of laser gain material is of a geometric shape having a pair of relatively broad mutually opposed faces spaced apart by a relatively narrow side face;
said lasant beam of stimulated emission is internally reflected to-and-fro between the opposed broad faces of said gain material along a zig-zag beam path; and
said optic waveguide means directs the optical pumping radiation emanating from said diode sources and as guided by said optic waveguide means into said structure of lasant material through at least one of said broad faces of said structure of lasant material.

10. The laser of claim 7 wherein:
said structure of laser gain material is of a geometric shape having a pair of relatively broad mutually opposed faces spaced apart by a relatively narrow side face; and
said optic waveguide means is disposed for directing the optical pumping radiation emanating from and as guided by said optic waveguide means from said diode sources into said member of lasant material through at least one of said broad faces of said structure of lasant material substantially collinearly with said beam of lasant radiation.

11. The laser of claim 10 including:
said driver means being disposed and arranged for rotating and translating said structure of lasant material relative to said selectively pumped region of said structure.

12. The laser of claim 7 wherein said structure of laser gain material is made of a bundle of fiber optic waveguides.

13. The meter of claim 3 wherein said step of directing said optical pumping radiation into said structure includes dividing said optical pumping radiation into spatial groups and directing the output of each group into said structure at respective intersections of said zig-zag beam path with said broad face.

14. The laser of claim 9 wherein said optic waveguide means includes grouping means which divides said optical pumping radiation into spatial groups and directed the output of each group into said structure at respective intersections of said zig-zag beam path with said broad face.

15. The laser of claim 12 including:
reflection means for reflecting the stimulated emission of lasant radiation to-and-fro from the end of and through each said individual fiber optic waveguide of said lasant material, along the length of each said fiber optic waveguide.

16. In a method for generating an output beam of coherent lasant radiation, the steps of:
producing optical pumping radiation;
guiding said pumping radiation to and thence into a selective region of a structure of laser gain material, said region being only a part of said structure;
stimulating emission of coherent lasant radiation from said region; and
imparting both translational and rotational relative motion to said structure relative to said region to cyclically move said selectively pumped region relative to the remainder of said gain material so as to distribute the heat generated in said laser gain material by said optical pumping radiation throughout said lasant material to inhibit thermally induced birefringence and gain non-uniformity effects on said output beam.

17. In a method for generating an output beam of coherent lasant radiation, the steps of:

producing optical pumping radiation;

coupling optical pumping radiation into a broad face of a selective region of a structure of laser gain material, said region being only a part of said structure, to stimulate emission of lasant radiation therein along a beam path having multiple intersections with said broad face;

dividing said optical pumping radiation into spatially separated groups and directing the output of each group into said structure at a respective intersection of said beam with said broad face; and imparting both translational and rotational relative motion to said structure relative to said region to cyclically move said selectively pumped region relative to the remainder of said gain material so as to distribute the heat generated in said laser gain material by said optical pumping radiation throughout said lasant material to inhibit thermally induced birefringence and gain non-uniformity effects on said output beam.

* * * * *